(12) United States Patent
Jesudoss et al.

(10) Patent No.: US 9,292,477 B1
(45) Date of Patent: Mar. 22, 2016

(54) METHOD AND SYSTEM FOR DATA VALIDATION

(75) Inventors: Gerard Jesudoss, Bangalore (IN); Anand Murugesan, Bangalore (IN); Gautham M. Chandran, Bangalore (IN); Swaminathan Balu, Bangalore (IN)

(73) Assignee: Oracle America Inc., Redwood Shores, CA (US)

( * ) Notice: Subject to any disclaimer, the term of this patent is extended or adjusted under 35 U.S.C. 154(b) by 1117 days.

(21) Appl. No.: 11/761,254

(22) Filed: Jun. 11, 2007

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 17/21 | (2006.01) |
| G06F 17/27 | (2006.01) |
| G06F 11/36 | (2006.01) |

(52) U.S. Cl.
CPC ............... *G06F 17/21* (2013.01); *G06F 11/36* (2013.01); *G06F 17/2725* (2013.01)

(58) Field of Classification Search
None
See application file for complete search history.

(56) References Cited

U.S. PATENT DOCUMENTS

| | | | |
|---|---|---|---|
| 6,745,168 B1 * | 6/2004 | Enomoto | 706/11 |
| 6,810,429 B1 * | 10/2004 | Walsh et al. | 709/246 |
| 2002/0038230 A1 * | 3/2002 | Chen | 705/7 |
| 2003/0074372 A1 * | 4/2003 | Barchi et al. | 707/104.1 |
| 2007/0112851 A1 * | 5/2007 | Tomic et al. | 707/104.1 |

* cited by examiner

*Primary Examiner* — Craig Dorais
(74) *Attorney, Agent, or Firm* — Osha Liang LLP

(57) ABSTRACT

A method for validating a data value, the method including receiving a data value entered into an input field of a software application, obtaining a validation rule corresponding to the input field from a validation rule book, executing the validation rule to determine a validation result, and returning the validation result to the software application.

13 Claims, 5 Drawing Sheets

METHOD AND SYSTEM FOR DATA VALIDATION

BACKGROUND

Data validation is an important aspect of protection against software malfunction and against many common attacks on software applications. For example, banking or other financial software may rely on the validation of numeric and date/time values provided as input to the software to avoid malfunctions.

Typically, data validation is tightly coupled to the software application itself and is embedded in various parts of the software application. That is, data validation is typically hard coded into a software application. Data validation can be designed in to a software application in several ways. For example, data validation can be incorporated into the client side code of a Web application, into user interface code, or into the core logic of the software application.

The types of data validation incorporated into a software application are driven, in part, by the business requirements of the intended user of the software application. Some of these validation requirements can be highly volatile nature as the requirements are driven by business requirements that change over time. For example, a shop may offer a 10% discount today for a purchase over $1000. However, the discount policy can change over time. That is, over time, the shop may change the discount percentage and/or the amount of the required minimum purchase. When data validation is tightly coupled to the application, a change to the software application itself is required if a business requirement driving a validation requirement changes.

SUMMARY

In general, in one aspect, the invention relates to a method for validating a data value. The method includes receiving a data value entered into an input field of a software application, obtaining a validation rule corresponding to the input field from a validation rule book, executing the validation rule to determine a validation result, and returning the validation result to the software application.

In general, in one aspect, the invention relates to a validation framework that includes a validation rule book including a plurality of validation rules and a validation manager. The validation manager is configured to receive a data value entered into an input field of a software application, obtain a validation rule of the plurality of validation rules corresponding from the validation rule book, wherein the validation rule corresponds to the input field, execute the validation rule to determine a validation result, and return the validation result to the software application.

In general, in one aspect, the invention relates to a computer readable medium including computer program code embodied therein for validating a data value. The computer program code includes instructions to receive a data value entered into an input field of a software application, obtain a validation rule corresponding to the input field from a validation rule book, execute the validation rule to determine a validation result, and return the validation result to the software application.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers. Further, the use of "ST" in the figures is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to methods and systems for data validation. More specifically, one or more embodiments of the invention provide a rule-driven framework for data validation that decouples validation logic from a software application. Validation rules and validation tasks may be defined for validating data values entered into input fields of input panels of a software application and installed for use by a validation framework. The validation framework provides an application programming interface (API) that may be used by the software application to validate data values entered into input fields of the software application from entities using the software application (e.g., a user or another software application). When the software application receives a data value for an input field that requires validation, the software application may access the validation framework via the API to request validation of the data value. The validation framework then uses the appropriate validation tasks and validation rules to validate the data value. Further, the validation rules and validation tasks may be changed without requiring a change to the software application.

Figure 1:
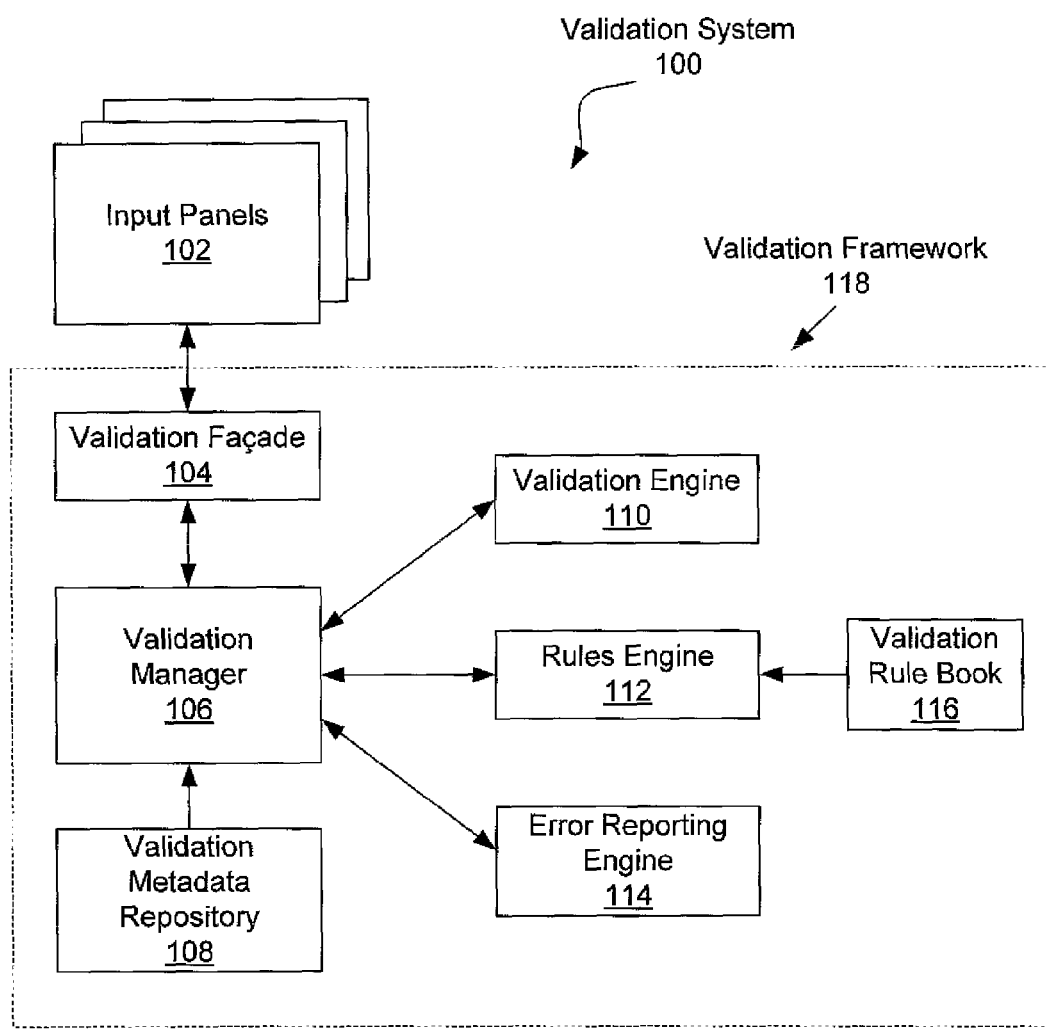
FIG. 1 shows a system in accordance with one or more embodiments of the invention.

FIG. 1 shows a validation system (100) in accordance with one or more embodiments of the invention. The validation system (100) includes components used for data validation. Specifically, the validation system (100) includes input panels (102) and a validation framework (118).

The input panels (102) are interfaces to a software application which permit data values to be submitted to the software application. A panel may include one or more input fields. Examples of panels include, but are not limited to, Web pages, formatted input screens, and other user interfaces. In some embodiments of the invention, an input panel may be a Java™ container. A Java™ container is a generic term for a graphical element of an interface that has subcomponents. Examples of containers include windows, frames, and dialog boxes. Java™ is a trademark of Sun Microsystems, Inc. located in Santa Clara, Calif.

The validation framework (118) includes a validation facade (104), a validation manager (106) and a validation metadata repository (208). Each of the aforementioned components of the validation framework (118) may be referred to as a portion of the "front end" (i.e., the interface portion) of the validation framework (118). The validation framework (118) further includes a validation engine (110), a rules engine (112), an error reporting engine (114), and a validation rule book (116). Each of these components of the validation framework (118) may be referred to as a portion of the "back end" (i.e., the processing portion internal to the validation (118).

The validation facade (104) provides an entry/exit point for all validation services provided by the validation framework (118) to a software application using the validation framework (118). The validation facade (104) exposes the API of the validation framework. This API may be used by a software application to request validation of data values entered into input fields of an input panel (e.g., an input panel of the input panels (102)). More specifically, the validation façade includes functionality to receive a validation request containing the data values and to return the result of the validation request to the software application. In one or more embodiments of the invention, the validation facade (104) includes functionality allowing a software application to request validation of all data values entered into all input fields of an input panel as a single request. In some embodiments of the invention, the validation facade (104) includes functionality allowing a software application to request validation of one data value at a time. Further, in some embodiments of the invention, the validation facade (104) includes functionality allowing a software application to specifically request the firing of one or more validation rules in the validation rule book (116).

The validation rule book (116) includes the validation rules for validating the input panels (102). A validation rule book may be defined using any structured format including plain text, a markup language, etc. A validation rule represents a condition and, when executed, determines whether the condition is satisfied or not. The validation rules in the validation rule book (116) may be basic validation rules, complex validation rules, and specialized validation rules. A basic validation rule checks whether a specified condition is satisfied or not given one or more inputs (i.e., data values entered into input fields of an input panel). A complex validation rule is a validation rule that includes dependencies. That is, a complex validation rule is formed by specifying one or more basic validation rules that must be fired before the rule of the complex validation rule is fired. A specialized validation rule checks for a desired state of a software application given one or more inputs. See DS_RUNNING_CHECK in Table 1 below for an example of a specialized validation rule.

Table 1 shows an example of a subset of rules for validating data inputs to an administrator login panel. For purposes of this example, the administrator login panel includes fields for the administer login identifier, the administrator password, the retyping of the administrator password, a port identifier, and a directory server identifier. This example is provided for exemplary purposes only and should not be construed as limiting the invention in any way.

TABLE 1

| Rule Name | Description | Inputs | Depends on |
| --- | --- | --- | --- |
| NOT_NULL_CHECK | This rule checks whether an input value is null or not. Validation passes if the given input is not null. | The rule takes a single input. Almost all user inputs are validated against this rule. | |
| NUMERIC_CHECK | This rule will check whether an input value contains only numeric characters. Validation passes if the given input value contains only numeric characters. | The rule takes a single input. Input values such as Port number must be validated against this rule. | NOT_NULL_CHECK |
| PASSWD_CHECK | This rule checks whether a given input is a valid password. | The rule takes a single input. Input values like passwords must be validated against this rule. | NOT_NULL_CHECK |
| PASSWD_MATCH_CHECK | This rule checks whether the original password and retyped password are same or not. Validation passes if both the passwords are same. | The rule takes two inputs. Password creation cases must be validated against this rule. | |
| PORT_CHECK | This rule checks whether or not the given input is a valid, usable port. Validation passes if the port is valid and usable. | The rule takes a single input. Input values like ports must be validated against this rule. | NOT_NULL _CHECK NUMERIC_CHECK |
| DS_RUNNING_CHECK | This rule checks whether or not the given inputs represent a valid running directory | The rule takes four inputs, the administrator id, password, host, and port. | |

TABLE 1-continued

| Rule Name | Description | Inputs | Depends on |
|---|---|---|---|
| | server. Validation passes if the given directory server is running. | | |

In one or more embodiments of the invention, a validation rule book is defined using extensible markup language (XML). In such embodiments, a validation rule includes a rule identifier (e.g., a rule name) and a validation executor identifier (e.g., a method name). A validation executor is an executable entity that includes the logic to perform the actual validation. A validation executor may be, for example, a method, an action, a function, a program, or any other executable logic. A validation executor accepts the inputs to the validation rule (e.g., a data value entered into an input field) and performs the validation. In some embodiments of the invention, a validation executor returns TRUE if the condition of the validation rule is satisfied and FALSE otherwise. A validation rule may also include one or more dependency specifications. A dependency specification specifies a validation rule that must be fired before the current validation rule is fired.

Table 2 shows an example of a portion of a validation rule book defined using XML that corresponds to the rules of Table 1. In this example, the validation executors are Java™ methods. This example is provided for exemplary purposes only and should not be construed as limiting the invention in any way.

TABLE 2

```
<rules>
   <rule id = "NOT_NULL_CHECK" method_name =
   "validateNotNull( )" />
   <rule id = "NUMERIC_CHECK" method_name =
   "validateNonNumeric( )"
       depends_on="NOT_NULL_CHECK" />
   <rule id = "PORT_CHECK" method_name = "validatePort( )"
       depends_on="NOT_NULL_CHECK, NUMERIC_CHECK"/>
   .
   .
<rules>
```

In one or more embodiments of the invention, the validation rule book (116) is stored in a validation rules repository (not specifically shown). The validation rules repository may store validation rule books for multiple software applications. The validation rules repository may be any device or medium capable of storing validation rules. For example, a validation rules repository may be one or more databases, a directory service, one or more flat files, a spreadsheet, an XML file, or any other suitable data repository. Further, the validation rules repository may be directly connected to the rules engine (112) or may be connected to the rules engine (112) via a network (not shown). The network may be a wide area network (WAN), a metropolitan area network (MAN), a local area network (LAN), a public network (such as the Internet or World Wide Web), or any combination thereof. Further, the network may include one or more networks interconnected by other network types (e.g., distinct LANs connected by one or more WANs).

The validation metadata repository (108) store validation metadata for each input panel of the input panels (102). Validation metadata is a specification of validation requirements for a given panel. More specifically, validation metadata defines the validation tasks to be performed for input fields of an input panel. A validation task specifies the validation rules to be applied to validate an input field and may also include one or more error messages to be returned to a software application if the validation fails.

The validation metadata repository (108) may be any device or medium capable of storing validation metadata. For example, a validation metadata repository (106) may be one or more databases, a directory service, one or more flat files, a spreadsheet, an XML file, or any other suitable data repository. Further, the validation metadata repository (108) may be directly connected to the validation manager (106) or may be connected to the validation manager (106) via a network (not shown). The network may be a wide area network (WAN), a metropolitan area network (MAN), a local area network (LAN), a public network (such as the Internet or World Wide Web), or any combination thereof. Further, the network may include one or more networks interconnected by other network types (e.g., distinct LANs connected by one or more WANs).

In one or more embodiments of the invention, a validation task is defined using extensible markup language (XML). Table 3 below shows an example of validation metadata for a panel used to set up a login identifier and password for an administrator that is defined using XML. This example is provided for exemplary purposes only and should not be construed as limiting the invention in any way.

As shown in this example, an input panel for defining an administrator login identifier and password includes an input field for the administrator login identifier (WS_ADMIN_ID), an input field for the proposed password (WS_ADMIN_PASSWD), and an input field for retyping the proposed password (retypeAdminPasswd). Three evaluation tasks are specified, one to check the validity of the proposed login identifier, one to check the validity of the proposed password, and one to check that the proposed password was accurately duplicated when retyped. Each validation task includes an identifier of a validation rule to be applied (e.g., ADMIN_ID_CHECK), the input modes supported by the rule (e.g., GUI, CLI, SIL), an identifier of the input field(s) (e.g., WS_ADMIN_ID) to be which the rule is to be applied, and error codes for each mode. The GUI mode specifies that the input field is provided in a graphical user interface (GUI). The CLI mode specifies that the input field is provided in a command line interface. The SLI mode specifies that the input field is provided in silent mode, i.e., that the data value in the input field is not provided by a user typing the value into a GUI or a command line but rather is provided from a script or input file.

TABLE 3

```
<panel_class
   class="com.sun.orion.installer.webserv.WebServerAdminstrationPanel">
      <rule id="ADMIN_ID_CHECK" modes="GUI,CLI,SIL">
         <fields>
            <field id="WS_ADMIN_ID"
```

TABLE 3-continued

```
        source_type="WIIZARD_STATE">
    </fields>
    <error_message modes="GUI" code="WebServerAdminPanel-GUI-
        install-InvalidID" />
    <error_message modes="CLI" code="WebServerAdminPanel-CLI-
        install-InvalidID"/>
    <error_message modes="SIL" code="WebServerAdminPanel-
        Silent-install-InvalidID"/>
</rule>
<rule id="PASSWD_CHECK" modes="GUI,CLI,SIL">
    <fields>
        <field id="WS_ADMIN_PASSWD"
            source_type="WIIZARD_STATE">
    </fields>
    <error_message modes="GUI" code="WebServerAdminPanel-
        GUI-install-AdminPasswdNull" />
    <error_message modes="CLI" code="WebServerAdminPanel-
        CLI-install-AdminPasswdNull"/>
    <error_message modes="SIL" code="WebServerAdminPanel-
        silent install-AdminPasswdNull"/>
</rule>
<rule id="PASSWD_MATCH_CHECK" modes="GUI,CLI">
    <fields>
        <field id="WS_ADMIN_PASSWD"
            source_type="WIZARD_STATE">
        <field id="retypeAdminPasswd" source_type="VARIABLE">
    </fields>
    <error_message modes="GUI" code="WebServerAdminPanel-
        GUI-install-PasswdMismatch" />
    <error_message modes="CLI" code="WebServerAdminPanel-
        CLI-install-PasswdMismatch"/>
</rule>
```

The rules engine (112) interacts with the validation manager (106) to form a set of validation rules to be fired. More specifically, the rules engine (112) includes functionality to receive requests for validation rules from the validation manager, to retrieve the requested rules and any dependent rules from the validation rule book (116), and to return the requested rules and the dependent rules to the validation manager (106). In some embodiments of the invention, the rules engine (112) includes APIs for the retrieval of all dependent validation rules of a validation rule, for retrieval of a master list of rules, and for retrieval of the validation executor identifier of a validation rule.

The validation engine (110) interacts with the validation manager (106) to perform validation. The validation engine includes functionality to fire a validation rule. That is, the validation engine (110) includes functionality to, upon request by the validation manager (106), execute validation logic corresponding to a validation rule, and to return an indication of whether the validation was successful or not to the validation manager (106). In one or more embodiments of the invention, the validation engine (110) includes the validation executors corresponding to the validation rules. The validation manager (106) requests firing of a validation rule by sending the validation engine (110) an identifier for the validation executor corresponding to the validation rule and the data inputs to be validated.

The error reporting engine (114) interacts with the validation manager (106) to perform error reporting. More specifically, the error reporting engine (114) includes functionality to, upon request by the validation manager (106), generate an error message to be returned to the software application when validation is not successful. As previously described, in one or more embodiments of the invention, a validation task may specify one or more error codes for a failed validation. Which error code to use depends on the input mode of the input panel. The validation manager (106) may extract the appropriate error code from the validation task when the validation fails and provide this error code to the error reporting engine (114) for use in generating the error message. Alternatively, the error reporting engine (114) upon notification of a validation failure by the validation manager (106) may determine the appropriate error code from the validation task.

The validation manager (106) controls the overall flow of validation. More specifically, the validation manager (106) includes functionality to interface with the other components of the validation framework to cause the validations requested by a software application to be performed. The validation manager (106) includes functionality to interact with the validation facade (104) to receive validation requests and to return the result of the validation requests. The validation manager (106) also includes functionality to request validation metadata corresponding to a validation request from the validation metadata repository (108). In one or more embodiments of the invention in which the validation metadata is defined in XML, the validation manager (106) may use Java™ Architecture for XML Binding (JAXB) to generate Java™ classes from the validation metadata.

The validation manager (106) further includes functionality to interact with the rules engine (112) to form the set of rules to be used to perform the requested validations based on the validation tasks defined in the validation metadata. More specifically, the validation manager (106) includes functionality to parse the validation metadata to determine what validation rules are needed and to request those validation rules from the rules engine (112). The validation manager (106) also includes functionality to parse the validation rules provided by the rules engine to determine if any dependent rules are needed and to request those dependent rules from the rules engine (112).

The validation manager (106) also includes functionality to interact with the validation engine (110) to request that each validation rule in the set of validation rules be fired and to receive an indication of the success or failure of the validation rule. The validation manager (106) further includes functionality to return a validation result to the software application. The validation result may be an indication that the validation was successful (i.e., that all applicable validation rules fired successfully) or an indication that the validation was not successful. (i.e., that one or more validation rules failed). In addition, the validation manager (106) includes functionality to request an error message from the error reporting engine (114) if a validation is not successful (i.e., one or more validation rules fail). The validation manager (106) may then include the error message in the validation result. In some embodiments of the invention, the validation manager (106) requests an identifier for a validation executor corresponding to a validation rule from the rules engine (112) and provides the identifier to the validation executor when requesting that the validation rule be fired.

Figure 2:
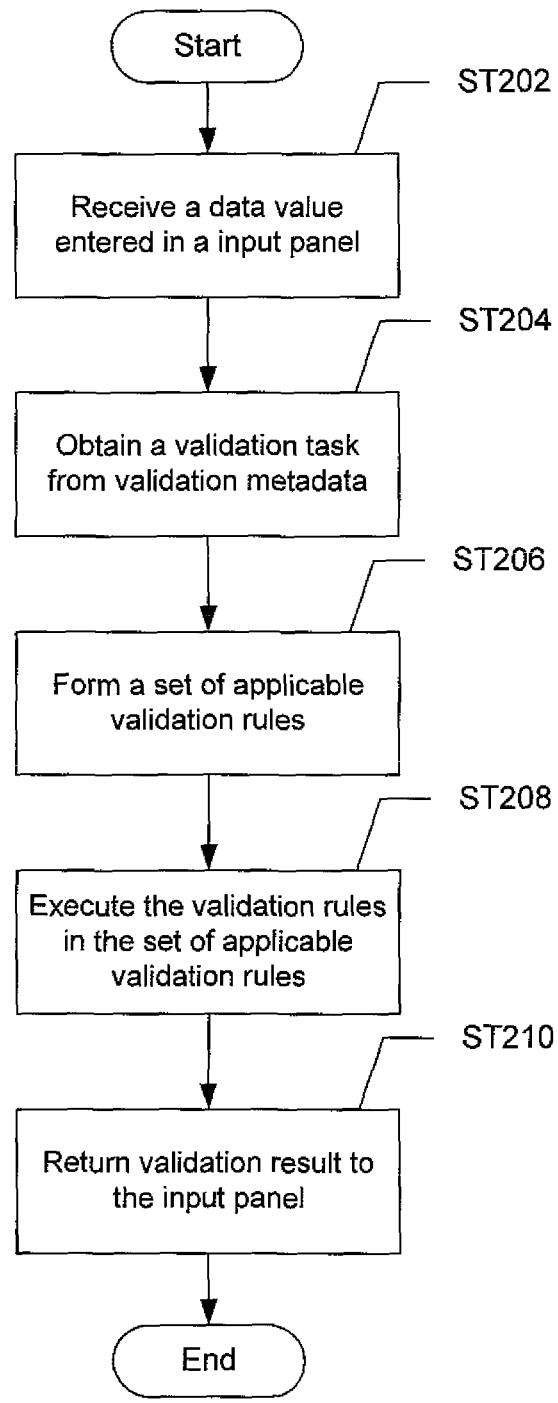
FIG. 2 shows a flowchart of a method in accordance with one or more embodiments of the invention.

FIG. 2 shows a method for validating a data value in accordance with one or more embodiments of the invention. Initially, a data value entered into an input filed of an input panel is received (ST202). The data value may be entered by a user operating a software application, or by another process, software application, input script, etc. In one or more embodiments of the invention, when the data value is entered into an input field of an input panel, the input panel communicates with a validation facade of a validation framework to request validation of the data value. In one or more embodiments of the invention, the validation request may include the data value, an identifier of the input field in which the data value was entered, and an identifier of the input panel. In other embodiments of the invention, the validation facade may receive a validation request and interact with the input panel to retrieve additional information needed to process the validation request. In one or more embodiments of the invention, the input panel may request validation of each data value individually. In other embodiments of the invention, the input panel may request validation of multiple data values entered into multiple input fields of the input panel in a single validation request. After the validation facade receives the validation request, the validation façade delegates processing of the validation request to the validation manager.

A validation task for the input field of the data value is then obtained from validation metadata for the input panel (ST204). As previously mentioned, a validation task specifies the validation rules to be applied to validate an input field. In one or more embodiments of the invention, the validation manager obtains the validation metadata for the input panel from a validation metadata repository and extracts the validation task for the input field from the validation metadata.

A set of applicable validation rules is then formed based on the content of the validation task (ST206). That is, each validation rule specified in the validation task is retrieved from a validation rule book and added to the set of applicable validation rules. Each of these validation rules is also examined for dependencies and the validation rules corresponding to the dependencies are added to the set of applicable validation rules. Similarly, any dependent validation rules are also examined for dependencies. The dependent validation rules are added to the set of applicable validation rules such that a dependent validation rule is executed before the validation rule specifying the dependency.

In one or more embodiments of the invention, the validation manager parses the validation task to determine which validation rules are to be applied. The validation manager interacts with a rules engine to form the set of applicable validation rules. More specifically, the validation manager looks for validation rule identifiers in the validation task. The validation manager then requests the identified validation rules from the rules engine, which in turn retrieves the requested validation rules from the validation rule book. In some embodiments of the invention, the validation manager examines each validation rule to determine if the validation rule has dependencies. In other embodiments of the invention, the rules engine provides all required dependent validation rules along with the requested validation rule.

The set of applicable validation rules is then executed (i.e., each validation rule is fired) (ST208) and a validation result is returned to the input panel (ST210). A validation result may be either an indication that the validation was successful or an indication that the validation failed. In some embodiments of the invention, the validation result includes an error message identifying why the validation failed. In one or more embodiments of the invention, all validation rules in the set of applicable validation rules are executed before a validation result is returned, even if one or more of the validation rules fail. In such embodiments, if more than one validation rule fails, multiple error messages may be returned to the input panel. In other embodiments of the invention, the validation rules in the set of applicable validation rules are executed until the first validation rule fails. In such embodiments, the validation result is returned to the input panel when the first failure occurs and includes an error message identifying the particular failure.

In one or more embodiments of the invention, the validation manager requests that a validation engine execute each validation rule. To request execution of a validation rule, the validation manager obtains an identifier of a validation executor for the validation rule from the rules engine and provides the validation executor identifier along with any required inputs to the validation engine. As previously explained, the validation executors for the validation rules in a validation rule book may be included in the validation engine. The validation engine executes the requested validation executor and returns a validation status to the validation manager. The validation status may be any value indicating success or failure of the validation rule. For example, in some embodiments of the invention, the validation status value is a binary value. In other embodiments of the invention, the validation status value is a Boolean value.

If the validation status indicates success, the validation manager then requests execution of the next validation rule in the set of applicable validation rules. If all the validation rules execute successfully, the validation manager returns a validation result to the input panel indicating that the validation was successful. If the validation status indicates a failure, the validation manager requests an appropriate error message from an error reporting engine. In some embodiments of the invention, the error reporting engine selects the appropriate error message based on the current mode of the software application having the input panel. Once the validation manager has the error message, the validation manager returns a validation result to the input panel that indicates that the validation failed and includes the error message. In one or more embodiments of the invention, the input panel displays the error message.

Figure 3A:
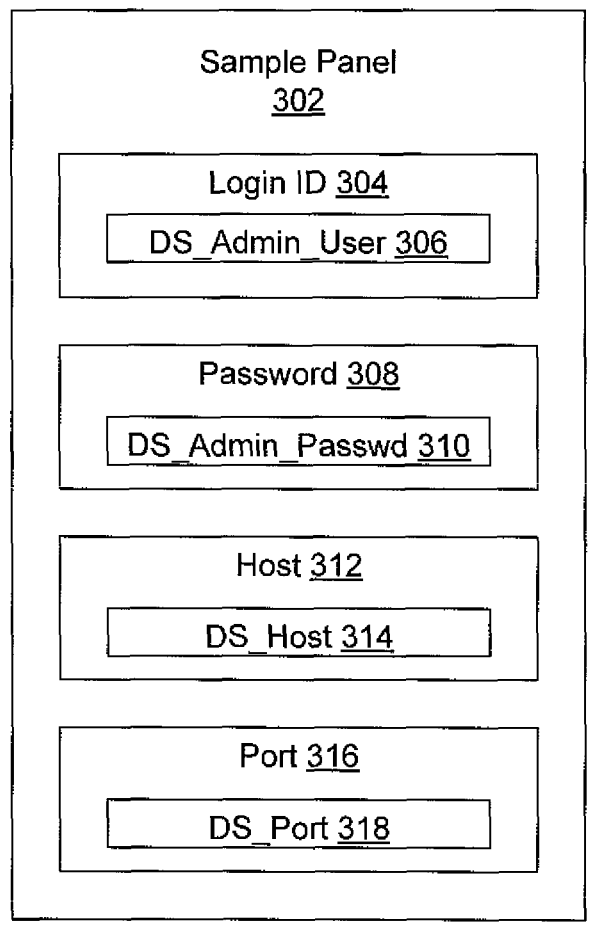
FIGS. 3A and 3B show an example in accordance with one or more embodiments of the invention.
Figure 3B:
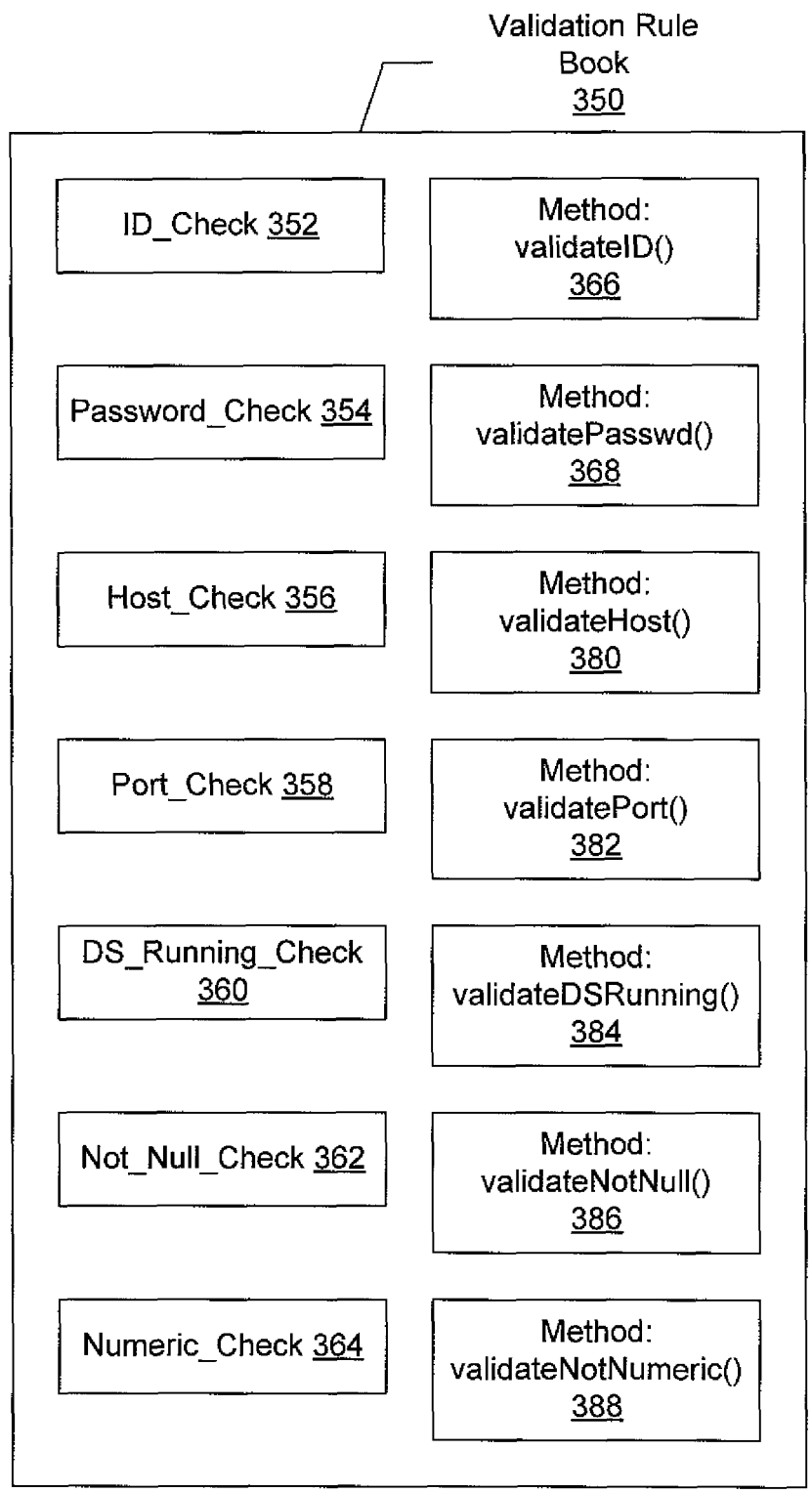

FIGS. 3A and 3B show an example of an input panel and an example of a validation rule book for the input panel in accordance with one or more embodiments of the invention. This example is included for exemplary purposes only and should not be construed as limiting the invention in any way. FIG. 3A shows a sample panel (302) in accordance with one or more embodiments of the invention. In this example, the sample panel (302) requests information for logging into a directory server. The sample panel (302) contains four Java™ containers: a Login ID container (304), a Password container (308), a Host container (312), and a Port container (316). Each container represents an input field in the sample panel (302). The Login ID container (304) includes the DS_ADMIN_USER input field (306) for entering an administrator login identifier, the Password container (308) includes the DS_ADMIN_PASSWD input field (310) for entering the administrator password corresponding to the login identifier, the Host container (312) includes the DS_HOST input field (314) for entering a host name, and the Port container (316) includes the DS_PORT input field (318) for entering a port number. Data values input into the input fields (306, 310, 314, 328) require validation before a user supplying the data values is permitted access the specified data server.

FIG. 3B shows an exemplary validation rule book (350) including validation rules that may be used in validation tasks defined for the sample panel (302) of FIG. 3A. The exemplary validation rule book (350) includes the following validation rules: an identification validation rule, ID_Check (352), for validating a login identifier entered into the DS_ADMIN_USER input field (306); a password validation rule, Password Check (354), for validating a password entered into the DS_ADMIN_PASSWD input field (310); a host validation rule, Host_Check (356) for validating the host name entered into the DS_HOST input filed (314); and a port validation rule, Port_Check (358) for validating a port number entered into the DS_PORT input field (318).

The validation rule book (350) also includes some dependent validation rules that may be included in the ID_Check (352), Password Check (354), Host_Check (356), and/or Port_Check (358) validation rules. These dependent validation rules include: a directory server validation rule, DS_Running_Check (360), for validating that a directory server specified in the DS_HOST input field (314) is running; a not null input validation rule, Not_Null_Check (362), for validating that a data value is actually entered in an input field (e.g., DS_ADMIN_USER input field (306), DS_ADMIN_PASSWD input field (310), DS_HOST input field (314), DS_PORT input field (318)); and a numeric input validation rule, Numeric_Check (364), for validating that a data value entered into an input field (e.g., DS_PORT input field (318)) is numeric.

Each of the validation rules (352, 354, 356, 358, 360, 362, 364) in the validation rule book (350) has a corresponding identifier for a validation executor (366, 368, 370, 372, 374, 376, 378) in the form a Java™ method. The Java™ method includes Java™ code to be executed to perform the actual validation.

Thus, for example, when a data value purporting to be an administrator identifier is entered as the input value of the DS_ADMIN_USER input field (306), the data value is sent to the validation manager by a validation facade. The validation manager, using a validation task for the input field that specifies the validation rules for validating the DS_ADMIN_USER input field (306), requests that a rule engine retrieve the ID_Check validation rule (352) from the validation rule book (350). The validation manager examines the ID_Check validation rule (352) and determines that the validation rule includes a dependent rule, Not_Null_Check (362). The validation manager then requests this dependent rule from the rules engine. The validation manager then forms the set of applicable validation rules in which the Not_Null_Check validation rule (362) is set to execute before the ID_Check validation rule (352).

To execute the validation rules in the set of applicable validation rules, the validation manager first requests the identifier (386) for the validation executor (i.e., validateNotNull( )) that corresponds to the Not_Null_Check validation rule (362). The validation manager then requests that the validation manager executes the identified validation executor and supplies the data value as a parameter. The validation engine then executes the Java™ method indicated by the validation executor identifier. If the Java™ method executes successfully, the validation manager then requests the identifier (366) for the validation executor (i.e., validateID( )) that corresponds to the ID_Check validation rule (352) from the rules engine. The validation manager again requests that the validation manager execute the identified validation executor and supplies the data value as a parameter. The validation engine again executes the Java™ method indicated by the validation executor identifier. If the second Java™ method executes successfully, the validation manager then returns a validation result to the sample panel (302) indicating that the data value is a valid administrator identifier. If the execution of either Java™ method fails, the validation manager returns a validation result to the sample panel (302) indicating that the data value is not a valid administrator identifier and including an error message corresponding to the validation failure.

Although systems and methods are described herein in which the data inputs to be validated come from an input panel, one of ordinary skill in the art will appreciate that the invention is not limited to such embodiments but extends to validation of any data input to a software application. For example, a software application may have an API that is used by other software programs. Rules and methods may be implemented for validating any data inputs submitted to the software application through the API.

Figure 4:
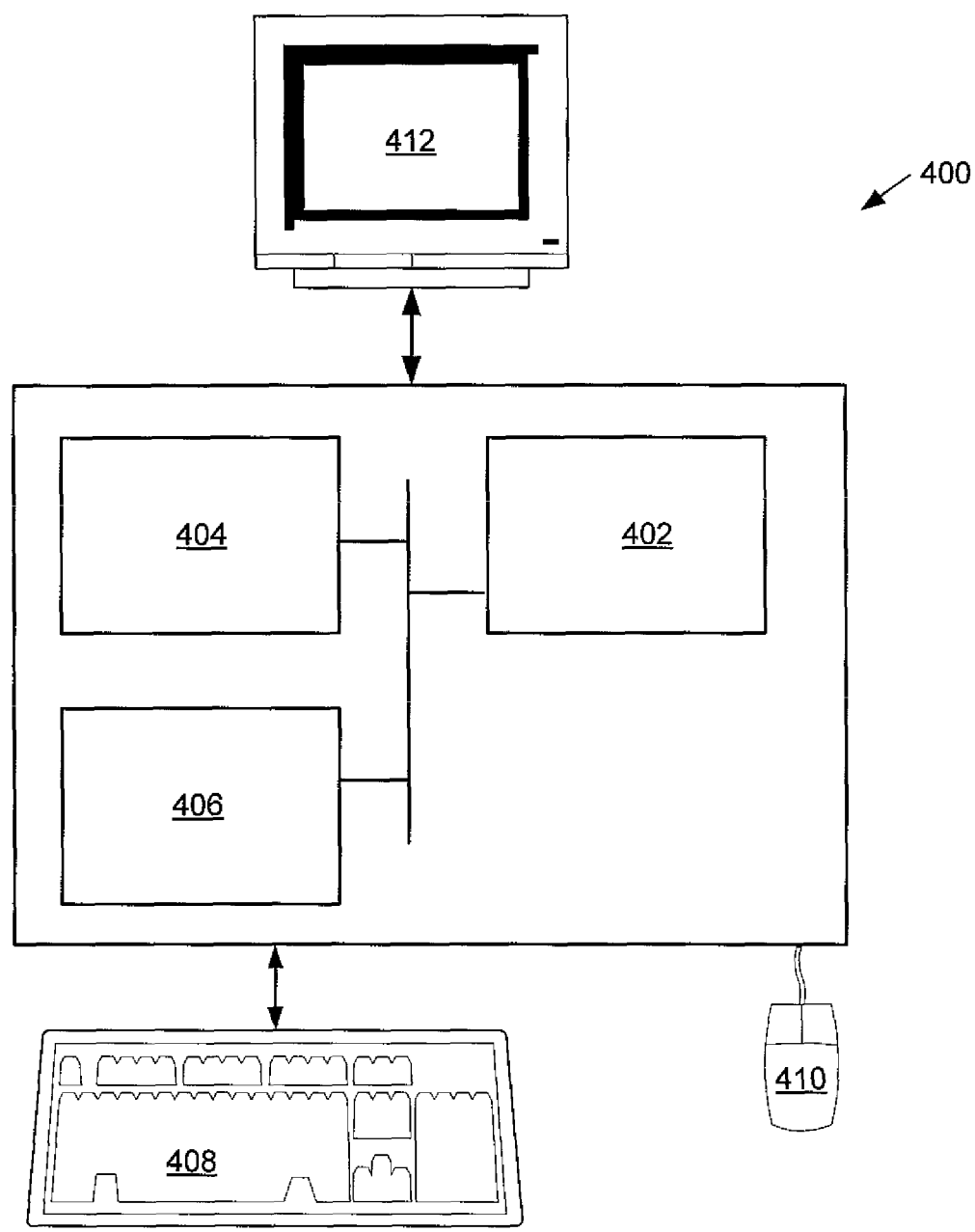
FIG. 4 shows a computer system in accordance with one or more embodiments of the invention.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a local area network (LAN) or a wide area network (e.g., the Internet) (not shown) via a network interface connection (not shown). Further, the computer system (400) may be a mobile device connected to a wireless connection. Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for validation, comprising:

receiving, from a software application, a plurality of data values entered into a plurality of input fields in an input panel of the software application, an identifier of the input panel, and an identifier of each of the plurality of input fields, wherein the software application requests validation of all of the plurality of data values entered into the plurality of input fields of the input panel as a single request;

obtaining, by a computer processor, validation metadata referenced by the identifier of the input panel from a validation metadata repository, wherein the validation metadata repository is distinct from the software application;

for each of the plurality of input fields of the input panel within the single request:

extracting, from the validation metadata, by the computer processor, a first validation task, identified in the validation metadata by the identifier of one of the plurality of input fields, wherein the first validation task is defined for the one input field;

identifying a first validation rule identifier in the first validation task;

obtaining, by the computer processor using the first validation rule identifier, a first validation rule specified by the first validation task from a validation rule book, wherein the validation rule book is distinct from the validation metadata repository;

examining, by the computer processor, the first validation rule for dependencies to identify a second validation rule, wherein the second validation rule is dependent on the first validation rule;

obtaining, from the validation rule book, the second validation rule specified by the first validation rule;

executing the second validation rule to obtain a successful validation status indicating that a corresponding data value for the one input field satisfied the second validation rule; and executing, on the computer processor and in response to the successful validation status, the first validation rule to validate the corresponding data value and generate a first validation result, wherein the first validation rule only executes when executing the second validation rule results in a successful validation status; and return a complete validation result comprising validation results for each of the plurality of input fields of the input panel, to the software application.

2. The method of claim 1, wherein the returning the first validation result further comprises:

returning the first validation result to the input panel of the software application.

3. The method of claim 1, wherein the executing the first validation rule further comprises:

executing a validation executor corresponding to the first validation rule, wherein the validation executor comprises validation logic for the first validation rule.

4. The method of claim 1, wherein the first validation result comprises an error message when the first validation rule fails.

5. The method of claim 4, wherein the error message is selected based on an operation mode of the software application.

6. The method of claim 1, further comprising:

changing, in the validation metadata in the validation metadata repository, the identifier of the one input field from identifying the first validation task to identifying the second validation task without changing the software application.

7. A system comprising:

a computer processor;

a validation rule book comprising a plurality of validation rules;

a validation metadata repository comprising:
  validation metadata for an input panel of a software application,
  wherein the validation metadata repository is distinct from the software application, and
  wherein the validation metadata repository is distinct from the validation rule book; and a validation manager, which when executed by the computer processor, is configured to:
  receive a plurality of data values entered into a plurality of input fields in an input panel of the software application, an identifier of the input panel, and an identifier of each of the plurality of input fields, wherein the software application requests validation of all of the plurality of data values entered into the plurality of input fields of the input panel as a single request;
  obtain the validation metadata referenced by the identifier of the input panel from the validation metadata repository;
  for each of the plurality of input fields of the input panel within the single request:
    extract, from the validation metadata, a first validation task, identified in the validation metadata by the identifier of one of the plurality of input fields, wherein the first validation task is defined for the one input field;
    identify a first validation rule identifier in the first validation task;
    obtain, using the first validation rule identifier, a first validation rule of the plurality of validation rules from the validation rule book, wherein the first validation rule is obtained based on the first validation rule being specified by the first validation task;
    examine the first validation rule for dependencies to identify a second validation rule, wherein the second validation rule is dependent on the first validation rule;
    obtain, from the validation rule book, the second validation rule specified by the first validation rule;
    execute the second validation rule to obtain a successful validation status indicating that a corresponding data value for the one input field satisfied the second validation rule; and
    execute, in response to the successful validation status, the first validation rule to validate the corresponding data value and generate a first validation result, wherein the first validation rule only executes when executing the second validation rule results in a successful validation status; and
  return a complete validation result comprising validation results for each of the plurality of input fields of the input panel, to the software application.

8. The system of claim 7, wherein the validation manager is further configured to return the first validation result by returning the first validation result to the input panel of the software application.

9. The system of claim 7, wherein the validation manager is further configured to execute the first validation rule by executing a validation executor corresponding to the first validation rule, wherein the validation executor comprises validation logic for the first validation rule.

10. The system of claim 7, wherein the validation result comprises an error message when the first validation rule fails.

11. The system of claim 7, wherein the validation manager is further configured to:

change, in the validation metadata in the validation metadata repository, the identifier of the one input field from identifying the first validation task to identifying the second validation task without changing the software application.

12. A non-transitory computer readable medium comprising computer program code embodied therein for validation, the computer program code comprising instructions to:

receive, from a software application, a plurality of data values entered into a plurality of input fields in an input panel of the software application, an identifier of the input panel, and an identifier of each of the plurality of input fields, wherein the software application requests validation of all of the plurality of data values entered into the plurality of input fields of the input panel as a single request;

obtain validation metadata referenced by the identifier of the input panel from a validation metadata repository, wherein the validation metadata repository is distinct from the software application;

for each of the plurality of input fields of the input panel within the single request:
  extract, from the validation metadata, a first validation task, identified in the validation metadata by the identifier of one of the plurality of input fields, wherein the first validation task is defined for the one input field, wherein the first validation task is defined for the one input field;

identifying a first validation rule identifier in the first validation task;

obtain, using the first validation rule identifier, a first validation rule specified by the first validation task from a validation rule book, wherein the validation rule book is distinct from the validation metadata repository;

examine, by the computer processor, the first validation rule for dependencies to identify a second validation rule, wherein the second validation rule is dependent on the first validation rule;

obtain, from the validation rule book, the second validation rule specified by the first validation rule;

execute the second validation rule to obtain a successful validation status indicating that a corresponding data value for the one input field satisfied the second validation rule; and execute, in response to the successful validation status, the first validation rule to validate the corresponding data value and generate a first validation result, wherein the first validation rule only executes when executing the second validation rule results in a successful validation status; and return a complete validation result comprising validation results for each of the plurality of input fields of the input panel, to the software application.

13. The non-transitory computer readable medium of claim 12, wherein the computer program code further comprises instructions to:

change, in the validation metadata in the validation metadata repository, the identifier of the one input field from identifying the first validation task to identifying the second validation task without changing the software application.

* * * * *